United States Patent

Osing

[11] Patent Number: 6,070,733
[45] Date of Patent: Jun. 6, 2000

[54] TREATMENT OF WASTE MATERIAL

[75] Inventor: Dirk Osing, Meerbusch, Germany

[73] Assignee: Heckert Multiserv PLC, London, United Kingdom

[21] Appl. No.: 08/737,081

[22] PCT Filed: Oct. 20, 1995

[86] PCT No.: PCT/GB95/02490

§ 371 Date: Oct. 30, 1996

§ 102(e) Date: Oct. 30, 1996

[87] PCT Pub. No.: WO96/12562

PCT Pub. Date: May 2, 1996

[30] Foreign Application Priority Data

Oct. 22, 1994 [DE] Germany .............................. 44 37 852

[51] Int. Cl.[7] .................. B03C 1/00; B02C 7/00
[52] U.S. Cl. .................. 209/8; 209/3; 209/214; 241/24.14
[58] Field of Search .................. 209/3, 4, 5, 8, 209/213, 214, 930; 241/20, 22, 23, 24.1, 24.13, 24.14

[56] References Cited

U.S. PATENT DOCUMENTS

| | | | |
|---|---|---|---|
| 959,239 | 5/1910 | Lockwood | 209/8 |
| 2,954,122 | 9/1960 | Colburn | 209/8 |
| 4,643,822 | 2/1987 | Parsonage | 209/8 |
| 4,726,895 | 2/1988 | Martinez | 209/214 X |
| 4,735,707 | 4/1988 | Bustamante | 209/8 X |
| 4,810,368 | 3/1989 | Seider et al. | 209/8 X |
| 5,332,493 | 7/1994 | Ginn et al. | 209/214 X |

FOREIGN PATENT DOCUMENTS

| | | |
|---|---|---|
| 0449090 | 10/1991 | European Pat. Off. . |
| 2411635 | 12/1977 | France . |
| 2411635 | 7/1979 | France . |
| 222774 | 1/1909 | Germany . |
| 403146 | 4/1923 | Germany . |
| 2349295 | 4/1975 | Germany . |
| 2800291 | 7/1979 | Germany . |
| 4238164 | 5/1994 | Germany . |
| 9408334 | 9/1994 | Germany . |
| 9408334 | 10/1994 | Germany . |
| 60-28543 | 7/1985 | Japan | 209/8 |
| 62-71556 | 4/1987 | Japan | 209/8 |

*Primary Examiner*—Tuan N. Nguyen
*Attorney, Agent, or Firm*—Alan G. Towner; Eckert Seamans Cherin & Mellott, LLC

[57] ABSTRACT

Shredder waste light fraction is converted into injectable material by being comminuted to an appropriate size. The copper and/or silica is then separated by magnetic separation so that the material may be injected into a metallurgical furnace or cement kiln.

6 Claims, 1 Drawing Sheet

TREATMENT OF WASTE MATERIAL

BACKGROUND OF THE INVENTION

FIELD OF THE INVENTION

The invention relates to the treatment of waste materials, such as shredder waste (also called Shredderleichtraktion in German) or residues. This waste arises from the recycling of bulky metal scrap by fragmentising using, e.g. a hammer mill. The heavy metal scrap typically is automobile bodies, white goods, light iron, heavy steel, structural steel. The raw material is fed into the hammermill, initially shred, and cleaned magnetically and by eddy currents to produce ferrous and non-ferrous products on separate production lines.

About 75% of old cars are fed into shredder installations for recycling the materials. About 25% of the shredder charge remains as non-recoverable residues and is disposed of mainly in landfill sites. The shortage of landfill capacity has in recent years driven up the costs of properly disposing of these residues. This cost increase, together with the decline in profits, is increasingly resulting in a disposal crisis for the car recycling business. The difficult situation regarding disposal has already led to the closure of shredder plants. This results in a shortage for the steel industry of an important source of raw material for steel manufacture and like processes.

The shredder waste typically comprises metals, plastics, wood and rubber, and depending on the nature of the material being fragmented will also contain copper, aluminium and other elements derived from say stainless steel, and possibly silica.

SUMMARY OF THE INVENTION

It is an object of this invention to provide means for recovering as much as possible of the ingredients of the shredder waste for economic re-use. The waste material may be considered as a source of carbon, i.e. the plastics, wood and rubber, and of metals for the steel works, e.g. aluminium. The copper is of value in smelting or refining. More specifically, the invention provides a method to remove, or substantially reduce, the copper content and/or the $SiO_2$ from glass or sand to provide a waste material containing the carbon sources and appropriate metals to be added to steel manufacturing furnaces without risk, and a copper enriched component which may be used in smelting or refining.

In one aspect, the invention provides a method of treating the light fraction of fragmented material, the method comprising fragmenting fragmentable material to provide a heavy fraction and a light fraction; characterised by reducing the size of the light fraction to particles of injectable size; mixing the particles with a magnetic substance to provide particles coated with the magnetic substance and particles which are not so coated; subjecting the mixture to magnetic separation; injecting the magnetised particles into the furnace.

One typical shredder waste has the following composition before separation of the heavy fraction (% by weight):

| Fe (total) | 25.4 | Fe (2+) | 2.74 | Fe (met.) | 3.86 |
|---|---|---|---|---|---|
| SiO2 | 30.9 | Al2O3 | 8.5 | CaO | 5.2 |
| MgO | 2.5 | TiO2 | 1.36 | P | 0.13 |
| Mn | 0.21 | Na | 1.98 | K | 0.94 |

-continued

| Cu | 2.81 | Pb | 0.37 | Zn | 4.37 |
|---|---|---|---|---|---|
| Cd | <0.001 | Cr | 0.15 | Ba | 0.28 |
| Ni | 0.13 | Mo | <0.05 | Co | 0.015 |
| Sn | <0.05 | As | <0.01 | Sb | <0.1 |
| V | 0.006 | C | 0.13 | S | 0.83 |
| Hg | <0.00002 | | | | |

Depending on the source the fraction may contain plastic which has entrapped other materials by being subjected to heat and/or pressure. The metal bits must be released from a plastic cover before they can be teased out.

The shredder light fractions are heterogeneous mixtures of plastic, rubber, wood, textile residues, glass, iron and non-iron particles, plastic fibres and inert materials. The non metallic makes up about 25% of the total weight. There are variously sized 'balls' of the fine plastic fibres, which enclose small particles of the above-mentioned materials. There are also small iron and non-iron particles in these balls, including copper in the form of small wires, partly in the shape of small rods, as well as in the form of minute pellets or tiny spirals. Some of these small wires have eyes and hooks formations and have become caught up in the fine plastic fibres. Larger pieces are present as well as numerous 'agglomerates' composed mainly of minute particles of the above-mentioned materials.

Fine and finest plastic fibres of <1 mm up to a few millimeters in length, in combination with moisture and an observable rust formation on iron particles led to agglomeration in very heterogeneous shapes (pellet, cubes, rod and the like). These shapes can easily be crumbled between the fingers. A large proportion of the powder fraction (micron size) adheres to and forms part of such agglomerates. Some copper and/or metal particles of lengths below 1 mm up to 3 cm in the form of little rods, triangles, spirals or loops are 'interwoven' with these agglomerates or have been caught up in the 'cocoon'. The largest proportion of these metal particles is however exposed.

The light fraction is reduced in size by comminution or like process to provide an average particle size appropriate to the equipment by which the particles can be injected into a furnace. Usually the particles will have an average particle size below about 8 mm. Comminution may be carried out in a suitable fragmentiser or rotary or pressure mixer.

When the reduced size particles are mixed with magnetic particles, those particles will adhere to the other particles wherever they can. They will adhere preferentially to rough surfaces, typically plastics, fibres, wood, rubber. It has been observed that they will not adhere as easily (if at all) to the smooth surface of copper wire and this difference in properties is an original way of separating copper and $SiO_2$ from the other materials.

The magnetic material preferably is a millscale, optionally with oil, and a carrier, e.g. water may be provided. Preferably the water content of the magnetic material is about 10 to 25% by weight. The water may be added deliberately or it may be derived from the millscale or the shredder waste or both. Instead of the magnetic mill scale slurry, other magnetic materials in dry or wet form with or without oil content can also be used. For example, blast furnace gas sludge and powders, Bessemer converter sludge and powders can be utilised. Preferably the mixing is carried out in a rotary mixer for at least 1.5 minutes.

Typically the shredder waste mass contains copper and the magnetic separation is carried out so as to remove some of the copper and provide particles having a low content of copper which can be used as a feed charge to a furnace or cement kiln. It is of advantage to add other materials. Examples include flyash and lime. These optional additives may be added before or after the magnetic separation. Preferably the flyash is mixed with the particles for at least two minutes. Calcium oxide is preferably added with the flyash. The flyash preferably has a grain size of about 70 to 90 micron. Instead of fly ash with free CaO contents, burned lime can also be used. If there is not enough moisture present in the shredder waste, which brings about a hydration process, then a proportionate quantity of water should be added.

In other aspects the invention provides a charge for use in a furnace or kiln and obtained from shredder waste light fraction, the charge comprising injectable magnetised particles of coated plastics, wood and rubber; and a method of separating copper and silica from a mixture containing particles derived from shredder waste light fraction, the method comprising adding a magnetic substance to the mixture, subjecting the mixture to magnetic separation and recovering the copper and silica.

DESCRIPTION OF THE DRAWING

In order that the invention may be well understood it will now be described by way of illustration with reference to the following example which is to be read in conjunction with the flow diagram of FIG. 1.

DESCRIPTION OF THE PREFERRED EMBODIMENTS

EXAMPLE

Figure 1:
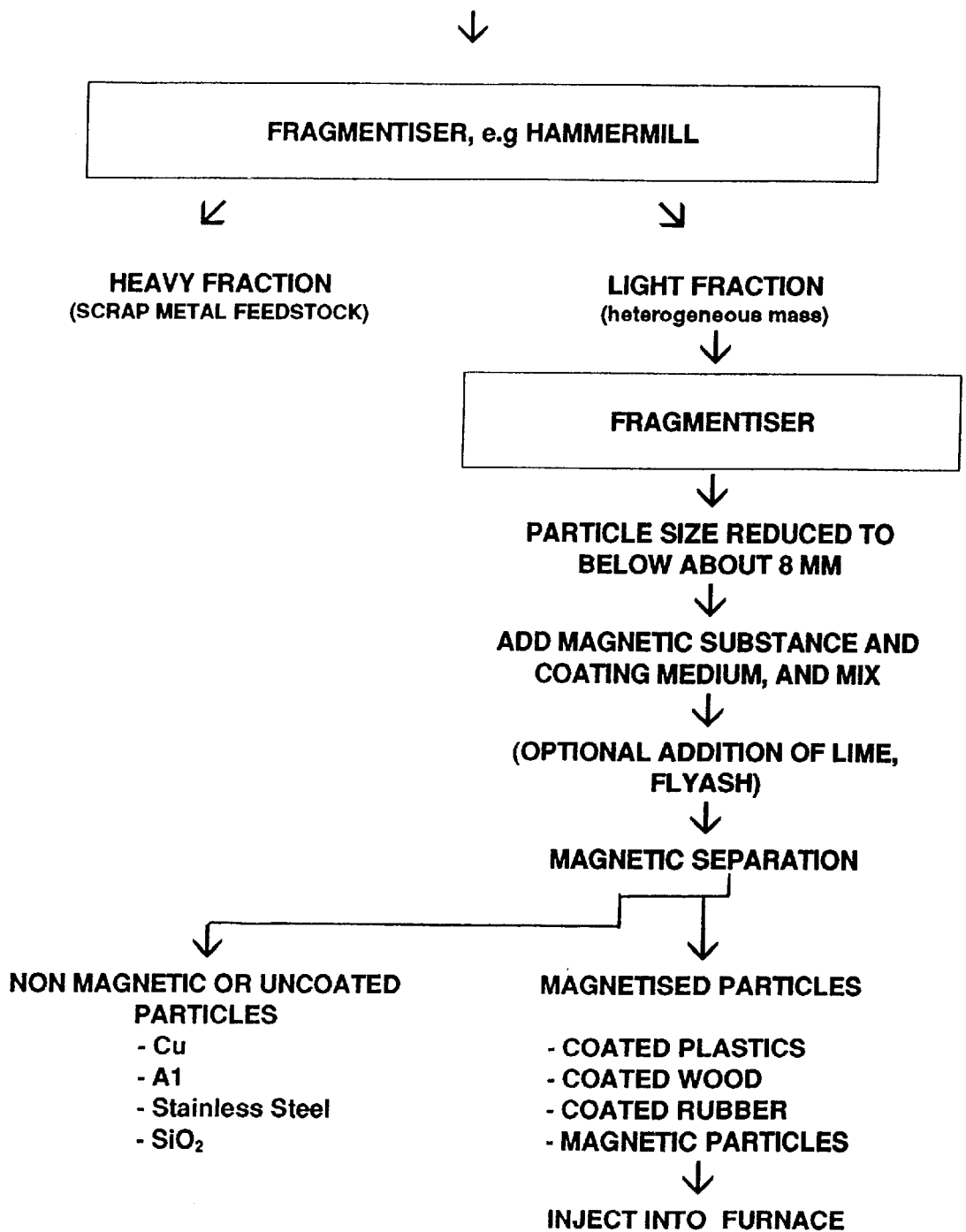

Used car bodies and like materials were treated in a hammermill fragmentiser to provide a heavy fraction useful as scrap metal feedstock, and a light fraction. The latter had the composition indicated above containing copper, aluminium, stainless steel, glass and $SiO_2$, e.g. sand; and carbon-containing materials such as plastics, wood and rubber. The light fraction was subjected to a comminution to provide agglomerates containing particles of about 8 mm average length. As a result of this treatment, a quantity of the agglomerates making up the waste is 'broken up' or crumbled, to expose some of the metal particles contained within and adhering to these agglomerates. A quantity of mill scale slurry, containing approximately 10–25% proportion of water, was added to the agglomerates and mixed for 1.5 to 2 minutes in a forced action mixer. The fine substances from the waste combine with the moist oily finest particles of the mill scale slurry to form micro-agglomerates which, when looked at with the naked eye, have unequal rounded shapes. When observed through a microscope, it can be seen that these small agglomerates have the shape of a 'sea urchin'. It was observed that while the mill scale adhered to the plastics, rubber and wood particles, the lengths of copper wire were uncoated, because the coating medium could not adhere to the smooth surface of the wire.

Approximately 20% (weight per cent) fly ash from a coal-fired power station with approximately 8% CaO was added to this two-component mixture and mixed for approximately 2 minutes to form substantially dry particles. The grain size of the ash is around 70–90 micron.

It was observed under the microscope that few metal laminae in a size of >0.5 mm were present in the newly produced agglomerates. The larger fraction of these scale laminae was lying loose 'with cleaned surface'. A large quantity of the copper wires was lying openly visible and free of adherent micro-substances adhering to them. In addition to the copper parts, other metals and steel parts/wires were also exposed. (Some copper wires were intertwined with the 'cocoon balls' and could not be freed as a result of mechanical treatment of the mixture). As a result of the mechanical treatment of the mass in the mixer, the sharp-edged small scale laminae have led to a cutting-up or crumbling of a largish number of the cocoon agglomerates. The fine ash particles coated the small agglomerates, consisting of shredder and mill scale substances as well as plastic fibres. The particles were left for two to three days for a hydration process to take place. This was exothermic. It was observed that, after approximately 24 hours, a temperature of up to 45° C. was reached. After 48 hours, the temperature in the heap reached the ambient temperature. The storage took place in covered rooms. The even 'soaking' of the heap of debris effected a faster 'drying', i.e. an increased evaporation of moisture. It was possible to reduce the moisture without thermal addition to below 10%.

The mixture, consisting of coated particles and uncoated particles was fed into a conventional magnetic separator. The magnetic substances were easily separated from the non-magnetic ones such as copper, aluminium, special steel, glass, and $SiO_2$. According to the chemical analysis, the proportion of copper, in comparison to the shredder raw faction, could be reduced by approximately 60%. The treated mixture has a minimal remaining proportion of copper and $SiO_2$. This mix is made up of plastics, wood, rubber and particles of magnetic metal could be added to a blast furnace. Because the atmosphere in the furnace is substantially oxygen-free and the temperature is very high the plastics burned without forming undesired by products.

The separated copper, aluminium, stainless steel and silica were recovered for use in appropriate industrial processes.

While this invention has been described in conjunction with specific embodiments thereof, it is evident that, after reading of the specification, many alternatives, modifications and variations may be suggested to those skilled in the art. Accordingly, the preferred embodiments of the invention as set forth herein, are intended to be illustrative, not limiting. Various changes may be made without departing from the spirit and full scope of the invention as set forth herein and defined in the appended claims to which reference should be made for a complete understanding of the invention.

I claim:

1. A method of treating a light fraction of fragmented metal-containing material, the method comprising:
   fragmenting fragmentable material to provide a heavy fraction and a light fraction, wherein the light fraction includes fragmented copper;
   reducing the light fraction to particles of injectable size;
   mixing the particles with a magnetic substance to provide particles coated with the magnetic substance and particles which are not so coated;

mixing a carbonaceous material with the coated particles and the uncoated particles; and subjecting the mixture to magnetic separation to provide substantially copper free material.

2. A method according to claim 1, wherein the carbonaceous material is flyash which is mixed with the particles for at least two minutes.

3. A method according to claim 2, wherein the flyash has a grain size of about 70 to 90 micron.

4. A method according to claim 1, including the step of adding lime with the carbonaceous material.

5. A method according to claim 1, including the subsequent step of injecting the substantially copper-free material into a metallurgical vessel or a cement kiln.

6. A method according to claim 1, wherein the copper is fragmented copper wire.

* * * * *